United States Patent Office 3,647,875
Patented Mar. 7, 1972

3,647,875
METHOD FOR PREPARING ALKOXY-PROPIONAMIDES
Lester E. Coleman, Willoughby Hills, Ohio, assignor to The Lubrizol Corporation, Wickliffe, Ohio
No Drawing. Continuation-in-part of application Ser. No. 682,493, Nov. 13, 1967, which is a continuation-in-part of abandoned application Ser. No. 586,391, Oct. 13, 1966. This application Mar. 2, 1970, Ser. No. 15,855
Int. Cl. C07c *103/00*
U.S. Cl. 260—561 B   5 Claims

ABSTRACT OF THE DISCLOSURE

N - 3 - oxohydrocarbon-substituted 3-alkoxypropionamides are prepared by reacting an alcohol with an N-3-oxohydrocarbon-substituted acrylamide in the presence of a strongly alkaline catalyst, the mole ratio of alcohol to substituted acrylamide being between about 8:1 and 12:1. The products are useful as chemical intermediates for the preparation of novel and useful compounds; for example, N-(1,1-dimethyl-3-oxobutyl)-3-methoxypropionamide can be converted to N-(1,1-dimethyl-3-hydroxybutyl)-acrylamide by hydrogenation followed by alkaline pyrolysis.

---

This application is a continuation-in-part of copending application Ser. No. 682,493, filed Nov. 13, 1967, now abandoned, which in turn is a continuation-in-part of application Ser. No. 586,391, filed Oct. 13, 1966, now abandoned.

This invention relates to methods for preparing compositions of matter, and more particularly to a new method for preparing a compound having the formula

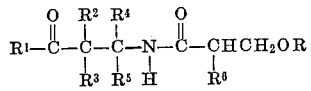

wherein each of $R^1$, $R^2$, $R^3$, $R^4$ and $R^5$ is hydrogen or a hydrocarbon radical and $R^6$ is hydrogen or a lower alkyl radical, which comprises reacting a compound of the formula ROH with an N-3-oxohydrocarbon-substituted acrylamide of the formula

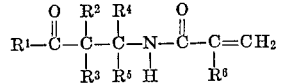

in the presence of a strongly alkaline catalyst; the mole ratio of said compound ROH to said N-3-oxohydrocarbon-substituted acrylamide being between about 8:1 and 12:1.

N-3-oxohydrocarbon-substituted 3-alkoxypropionamides of the type represented by the above formula are surface active and may be used as surfactants, detergents, wetting agents, penetrants, emulsifying agents, solubilizers and textile dyeing assistants. Those in which R is a higher alkyl group such as n-amyl or isooctyl are useful as plasticizers in polyvinyl chloride and similar resinous materials.

These compounds are also useful as chemical intermediates, particularly for the preparation of interesting and useful derivatives of N-3-oxohydrocarbon-substituted acrylamides. Because of the presence in their molecular structure of an olefinic double bond, the latter compounds, of which N-(1,1-dimethyl-3-oxobutyl)acrylamide (diacetone acrylamide) is a preferred example, undergo many side reactions when attempts are made to convert them into other compounds. For example, when the 3-oxo group is reduced to a hydroxy group, the olefinic double bond is usually also reduced to an ethyl group. The olefinic double bond may be blocked from such reactions by reacting it with an alcohol and can subsequently be regenerated, typically by pyrolysis of the products in contact with strong alkali. By this means, it is possible to prepare compounds such as N-(1,1-dimethyl-3-hydroxybutyl)acrylamide, which is a useful monomer.

In the course of reacting an alcohol with an N-3-oxohydrocarbon-substituted acrylamide, by-products such as the N-unsubstituted alkoxypropionamide, acrylamide and mesityl oxide or its analogs are frequently formed. The formation of such by-products is particularly noticeable in the later stages of the reaction, at which point the yield of the desired product decreases materially.

A principal object of the present invention, therefore, is to prepare N-3-oxohydrocarbon-substituted 3-alkoxypropionamides and similar compounds in good yields by a simple method.

A further object is to prepare such compounds by a method which affords the desired product contaminated with the smallest possible amount of by-products and impurities.

Other objects will in part be obvious and will in part appear hereinafter.

The reagents used in the method of this invention are a compound of the formula ROH and an N-3-oxohydrocarbon-substituted acrylamide having the formula presented hereinabove. In these formulas, R and $R^{1-5}$ may be hydrocarbon radicals.

As used herein, the term "hydrocarbon radical" includes aliphatic, cycloaliphatic and aromatic (including aliphatic-substituted aromatic and aromatic-substituted aliphatic) radicals. Substituted hydrocarbon, alkyl, aryl, etc., radicals are considered to be fully equivalent to the hydrocarbon, alkyl, aryl, etc., radicals and to be part of this invention. By "substituted" is particularly meant radicals containing relatively inert substituents such as ether (especially lower alkoxy), ester (especially lower carbalkoxy), keto, nitro, halogen and the like so long as these substituents do not alter significantly the character or reactivity of the radical. In general, no more than about three such substituent groups will be present for each 10 carbon atoms in the radical.

The following are illustrative of hydrocarbon and substituted hydrocarbon radicals within the scope of this invention.

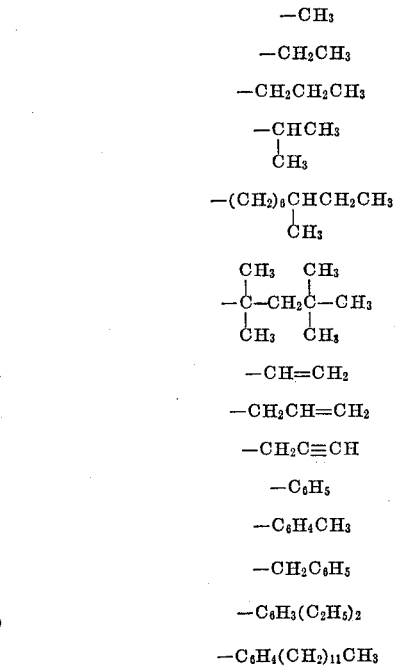

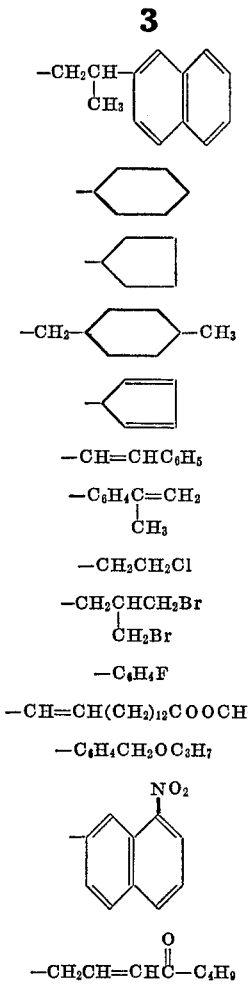

—CH=CHC₆H₅

—C₆H₄C=CH₂
     |
     CH₃

—CH₂CH₂Cl

—CH₂CHCH₂Br
    |
    CH₂Br

—C₆H₄F

—CH=CH(CH₂)₁₂COOCH₃

—C₆H₄CH₂OC₃H₇

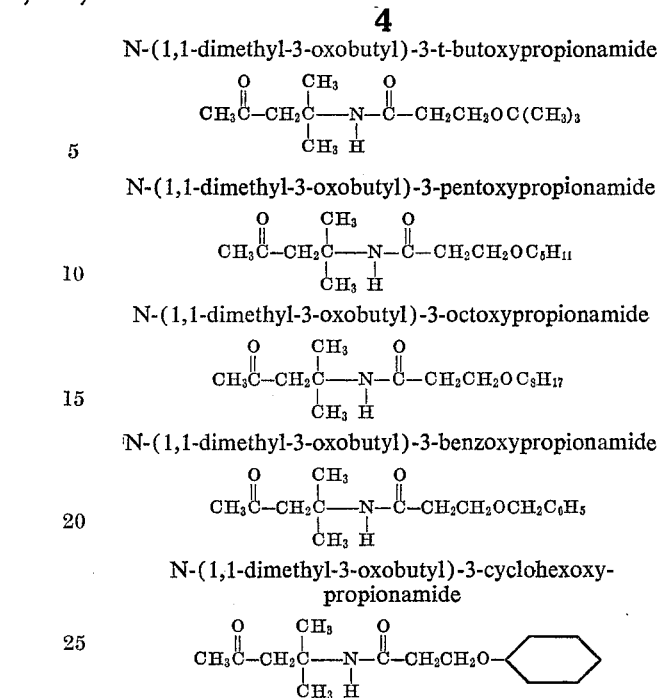

—CH₂CH=CHC(O)—C₄H₉

Preferably, the hydrocarbon or substituted hydrocarbon radicals in the compounds prepared by the method of this invention are lower hydrocarbon radicals, the word "lower" denoting radicals containing no more than about 12 carbon atoms. Still more preferably, they are lower alkyl or aryl radicals, most often alkyl. Frequently, and most desirably, R, R¹, R⁴ and R⁵ are lower alkyl radicals; R² and R³ are hydrogen; and R⁶ is hydrogen or methyl.

The following are illustrative of compounds which may be prepared by the method of this invention.

N-(1,1-dimethyl-3-oxobutyl)-3-methoxypropionamide

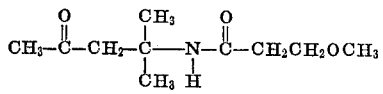

N-(1-methyl-1-ethyl-3-oxopentyl)-3-methoxy-2-methylpropionamide

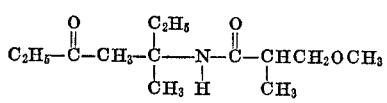

N-(1,3-diphenyl-1-methyl-3-oxopropyl)-3-ethoxypropionamide

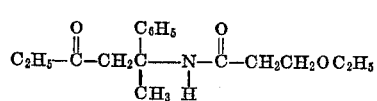

N-(1,1-dimethyl-3-oxobutyl)-3-n-butoxypropionamide

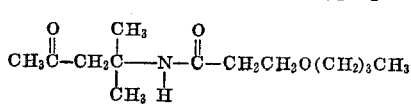

N-(1,1-dimethyl-3-oxobutyl)-3-t-butoxypropionamide $$CH_3\overset{O}{\overset{\|}{C}}-CH_2\overset{CH_3}{\underset{CH_3}{\overset{|}{C}}}-N\underset{H}{\overset{|}{-}}\overset{O}{\overset{\|}{C}}-CH_2CH_2OC(CH_3)_3$$

N-(1,1-dimethyl-3-oxobutyl)-3-pentoxypropionamide $$CH_3\overset{O}{\overset{\|}{C}}-CH_2\overset{CH_3}{\underset{CH_3}{\overset{|}{C}}}-N\underset{H}{\overset{|}{-}}\overset{O}{\overset{\|}{C}}-CH_2CH_2OC_5H_{11}$$

N-(1,1-dimethyl-3-oxobutyl)-3-octoxypropionamide $$CH_3\overset{O}{\overset{\|}{C}}-CH_2\overset{CH_3}{\underset{CH_3}{\overset{|}{C}}}-N\underset{H}{\overset{|}{-}}\overset{O}{\overset{\|}{C}}-CH_2CH_2OC_8H_{17}$$

N-(1,1-dimethyl-3-oxobutyl)-3-benzoxypropionamide $$CH_3\overset{O}{\overset{\|}{C}}-CH_2\overset{CH_3}{\underset{CH_3}{\overset{|}{C}}}-N\underset{H}{\overset{|}{-}}\overset{O}{\overset{\|}{C}}-CH_2CH_2OCH_2C_6H_5$$

N-(1,1-dimethyl-3-oxobutyl)-3-cyclohexoxy-propionamide $$CH_3\overset{O}{\overset{\|}{C}}-CH_2\overset{CH_3}{\underset{CH_3}{\overset{|}{C}}}-N\underset{H}{\overset{|}{-}}\overset{O}{\overset{\|}{C}}-CH_2CH_2O-C_6H_{11}$$

As previously explained, the method of this invention involves the reaction of a compound of the formula ROH, which may, for example, be an alcohol or a phenol but which is hereinafter sometimes referred to as an alcohol, with an N-3-oxohydrocarbon-substituted acrylamide as defined hereinabove, in the presence of a strongly alkaline catalyst. Illustrative N-3-oxohydrocarbon-substituted acrylamides which may be used are disclosed and claimed in U.S. Pats. 3,277,056 and 3,425,942. Especially suitable are N-(1,1-dimethyl-3-oxobutyl)acrylamide, hereinafter referred to as diacetone acrylamide; N-(1,1-dimethyl-3-oxobutyl)methacrylamide, or diacetone methacrylamide; and N - (1,3 - diphenyl - 1-methyl-3-oxopropyl)acrylamide, or diacetophenone acrylamide. Since diacetone acrylamide is the most readily available compound of this type, reference will frequently be made to it hereinafter; however, it is to be understood that any of the other N-3-oxohydrocarbon-substituted acrylamides may be substituted therefor.

The alkaline catalyst used in the reaction may be an alkali metal such as sodium or potassium; an alkali metal hydroxide such as sodium or potassium hydroxide; an alkoxide such as sodium methoxide, sodium ethoxide, potassium n-butoxide or sodium cyclohexoxide; an alkali metal hydride; or a quaternary ammonium hydroxide such as tetramethylammonium hydroxide. It is frequently convenient to react the alkali metal with the alcohol being used as a reagent, prior to the addition of the diacetone acrylamide, to form the corresponding alkoxide which is then employed as a catalyst. The amount of alkaline catalyst required is generally no more than about 0.1–3 mole per mole of diacetone acrylamide.

A critical feature of the method of this invention is the mole ratio of alcohol to diacetone acrylamide. This mole ratio should be between about 8:1 and 12:1. Within this range, the reaction product consists almost entirely of the desired compound, with an absolute minimum of by-products. At lower mole ratios, it is found that higher proportions of such by-products as the N-unsubstituted alkoxypropionamide, acrylamide and mesityl oxide are obtained.

The reaction temperature is not critical but is usually about 50–100° C., preferably about 50–80° C. Particularly when the alcohol is solid or non-volatile, it may be necessary or convenient to employ an inert solvent such as ethyl ether, butyl ether, acetone, methyl isobutyl ketone, an ether or polyether derived from ethylene glycol, or the like. In the preferred temperature range, the reaction is usually complete within about 6–10 hours, after which the product may be isolated by distillation, recrystallization or the like.

The method of this invention is illustrated by the following examples.

EXAMPLE 1

To a solution of 4070 parts (24 moles) of N-(1-dimethyl-3-oxobutyl)acrylamide (diacetone acrylamide) in about 6000 parts of methanol is added a solution of sodium methoxide prepared from 54 parts (2.4 moles) of sodium in about 144 parts of methanol. (A total of 192 moles of methanol is used.) The resulting solution is heated under reflux for 6½ hours, and then 120 parts of sulfuric acid is added, followed by a few grams of acetic acid to neutralize the mixture. The methanolic solution is filtered and the methanol is removed by distillation under reduced pressure. There is obtained 4535.8 parts (94% of the theoretical amount) of N-(1,1-dimethyl-3-oxobutyl)-3-methoxypropionamide. The product is a clear liquid.

EXAMPLE 2

Following the procedure of Example 1, N-(1,3-diphenyl-1-methyl-3-oxopropyl)-3-ethoxypropionamide is prepared from 2930 parts (10 moles) of N-(1,3-diphenyl-3-oxopropyl)acrylamide and 3680 parts (80 moles) of absolute ethanol, in the presence of sodium ethoxide prepared from 23 parts (1 mole) of sodium.

EXAMPLE 3

A solution of 169 parts (1 mole) of diacetone acrylamide and 9.1 parts (0.1 mole) of tetramethylammonium hydroxide in 250 parts (8 moles) of methanol is heated under reflux for about 5 hours. The solution is then neutralized with sulfuric acid and a small amount of acetic acid and the methanol is removed by distillation under reduced pressure. The product is N-(1,1-dimethyl-3-oxobutyl)-3-methoxypropionamide.

EXAMPLE 4

Sodium, 2.3 parts (0.1 mole), is added to 100 parts of isooctyl alcohol. The solution is then added to a solution of 169 parts (1 mole) of diacetone acrylamide in 940 parts of isooctyl alcohol (8 moles total). The solution is heated for 2 hours at 60–70° C. and neutralized with sulfuric acid (to just short of neutral) and acetic acid. The excess isooctyl alcohol is removed by evaporation under reduced pressure to give the desired product, N-(1,1-dimethyl-3-oxobutyl)-3-pentoxypropionamide.

EXAMPLE 5

The effect of mole ratio on product yield and purity is shown by a series of experiments in which diacetone acrylamide is reacted with methanol at reflux temperature in the presence of sodium methoxide, the mole ratio of diacetone acrylamide to sodium methoxide being 10:1. Three mole ratios of methanol to diacetone acrylamide (4:1, 8:1 and 12:1) are used. The reaction mixture is analyzed for product and by-product content at intervals. The results are given in the following table.

| Mole ratio, methanol/diacetone acrylamide | Percent yield, product/by-product | | | | |
|---|---|---|---|---|---|
| | 1 hour | 2 hours | 4 hours | 6 hours | 10 hour |
| 4:1 | 89/0.6 | 93/4.1 | 90/8 | | |
| 8:1 | 42/0 | 82/0 | 94/0.9 | 97/1.0 | |
| 12:1 | 10/0 | 22/0 | 44/0 | 67/0 | 94/0 |

These results show the effectiveness of the method of this invention for suppressing by-product formation and insuring maximum purity of the desired product.

The compounds prepared by the method of this invention may also be prepared by reacting one mole of a nitrile of the formula $$ROCH_2CHCN$$
$$\phantom{ROCH_2CH}|$$
$$\phantom{ROCH_2CHC}R^6$$

with at least one mole of a β-hydroxy oxohydrocarbon or an α,β-unsaturated oxohydrocarbon, or with at least two moles of an aldehyde or ketone, in the presence of at least one mole of sulfuric acid. This reaction is similar to that used for the preparation of N-3-oxohydrocarbon-substituted acrylamides, and disclosed and claimed in the aforementioned U.S. Pat. 3,277,056. For example, N-(1,1-dimethyl-3-oxobutyl)-3-methoxypropionamide can be prepared by reacting one mole of 3-methoxypropionitrile with one mole of mesityl oxide or diacetone alcohol, or with two moles of acetone, in the presence of 1–2 moles of sulfuric acid.

As previously stated, the compounds obtained by the method of this invention are intermediates for the formation of useful monomers such as N-(1,1-dimethyl-3-hydroxybutyl)acrylamide. Polymers of this latter compound may be formed into membranes which are useful for desalination of water by hyperfiltration.

The following examples illustrate reactions of the compounds produced by the method of this invention to form useful products.

EXAMPLE 6

A solution of 490 parts of N-(1,1-dimethyl-3-oxobutyl)-3-methoxypropionamide in 320 parts of methanol is purged with nitrogen, and 28.2 parts of Raney nickel is added. The mixture is pressurized with hydrogen in an autoclave at 1150 p.s.i. and heated to 49° C., and then to 72° C. over 45 minutes. After heating at 72° C. for an additional 3½ hours, with periodic restoration of the 1150 p.s.i. hydrogen pressure, the Raney nickel is removed by filtration and the methanol is stripped. There is obtained 475 grams of N-(1,1-dimethyl-3-hydroxybutyl)-3-methoxypropionamide.

EXAMPLE 7

The product of Example 6 is allowed to drip onto sodium hydroxide pellets heated at 160–170° C. in a glass tube which has been evacuated to a pressure of 30 mm. The system is maintained under nitrogen during the reaction. There is obtained a 98% yield of N-(1,1-dimethyl-3-hydroxybutyl)acrylamide.

EXAMPLE 8

A solution of 100 grams of N-(1,1-dimethyl-3-hydroxybutyl)acrylamide in 400 grams of benzene is heated under reflux, and 10 ml. of a solution of 2 parts of azobisisobutyronitrile in 40 ml. of benzene is added. The mixture is stirred and cooled to room temperature, whereupon an orange gel forms. It is removed by filtration, pulverized in heptane and dried under vacuum. The polymer is then purified by dissolving in methanol and reprecipitating with water.

A solution of 20 parts of the above polymer in 30 parts of formamide and 80 parts of acetone is cast on glass and the solvent is evaporated to form a 1-mil film. After drying, the film is removed by soaking in water at room temperature for one hour and at 40° C. for 15 minutes. When used as a hyperfiltration membrane for desalinating a 0.5 sodium chloride solution at 600 p.s.i.g., this membrane gives a salt rejection of 82.5% at a water flux of 300 gallons per square foot per day.

What is claimed is:

1. A method for preparing a compound having the formula $$R^1-\overset{O}{\overset{\|}{C}}-\overset{R^2}{\underset{R^3}{\overset{|}{C}}}-\overset{R^4}{\underset{R^5}{\overset{|}{C}}}-\underset{H}{\overset{|}{N}}-\overset{O}{\overset{\|}{C}}-\overset{}{\underset{R^6}{\overset{|}{C}}}HCH_2OR$$

wherein each of R, R¹, R², R³, R⁴ and R⁵ is hydrogen or a hydrocarbon radical and R⁶ is hydrogen or a lower alkyl radical, which comprises reacting a compound of the formula ROH with an N-3-oxohydrocarbon-substituted acrylamide of the formula

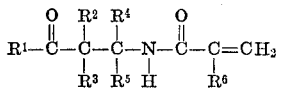

in the presence of a strongly alkaline catalyst; the mole ratio of said compound ROH to said N-3-oxohydrocarbon-substituted/acrylamide being between about 8:1 and 12:1.

2. The method of claim 1 wherein R is a lower alkyl radical, each of R², R³, and R⁶ is hydrogen, each of R¹, R⁴ and R⁵ is methyl, and the reaction temperature is about 50–100° C.

3. The method of claim 2 wherein the catalyst is an alkali metal alkoxide of a lower alkanol.

4. The method of claim 3 wherein R is methyl.

5. The method of claim 4 wherein the alkali metal alkoxide is sodium methoxide.

References Cited

UNITED STATES PATENTS 3,525,768   8/1970   Hoke _____ 260—561

OTHER REFERENCES

Kirk-Othmer: Encyclopedia of Chemical Technology (1963), vol. 1, p. 276.

Wagner et al.: Synthetic Organic Chemistry (1953), p. 233.

LEWIS GOTTS, Primary Examiner

E. G. LOVE, Assistant Examiner

U.S. Cl. X.R.

252—152; 260—89.7, 559 B, 562 R